US012214991B2

(12) United States Patent
Sakai

(10) Patent No.: US 12,214,991 B2
(45) Date of Patent: Feb. 4, 2025

(54) FOIL TRANSFER DEVICE

(71) Applicant: Brother Kogyo Kabushiki Kaisha, Nagoya (JP)

(72) Inventor: Ryosuke Sakai, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 306 days.

(21) Appl. No.: 17/936,579

(22) Filed: Sep. 29, 2022

(65) Prior Publication Data

US 2023/0026026 A1 Jan. 26, 2023

Related U.S. Application Data

(63) Continuation of application No. PCT/JP2021/011572, filed on Mar. 22, 2021.

(30) Foreign Application Priority Data

Apr. 1, 2020 (JP) ................................ 2020-065609

(51) Int. Cl.
*B41F 16/00* (2006.01)
*B65H 1/08* (2006.01)
(Continued)

(52) U.S. Cl.
CPC ............... *B65H 7/20* (2013.01); *B41F 16/00* (2013.01); *B65H 1/08* (2013.01); *B65H 7/02* (2013.01);
(Continued)

(58) Field of Classification Search
CPC .......... B41F 16/00; B65H 1/08; B65H 26/00; B65C 9/42
See application file for complete search history.

(56) References Cited

U.S. PATENT DOCUMENTS

2002/0096063 A1* 7/2002 Yokozawa ............ B41F 19/068 101/11
2002/0122671 A1 9/2002 Yoshimura
(Continued)

FOREIGN PATENT DOCUMENTS

JP 2002-127364 A 5/2002
JP 2002-132099 A 5/2002
(Continued)

OTHER PUBLICATIONS

Sep. 29, 2022—(WO) International Preliminary Report on Patentability—App PCT/JP2021/011572, Eng. Tran.
(Continued)

*Primary Examiner* — Daniel McNally
(74) *Attorney, Agent, or Firm* — Banner & Witcoff, Ltd.

(57) ABSTRACT

A foil transfer device includes a foil transfer film cartridge, a housing, a display, a detector, and a controller. The foil transfer film cartridge includes a supply reel on which a foil film is wound. The housing allows the foil transfer film cartridge to be removably installed therein. The display is provided on the housing to display information. The detector detects foil film information in a state where the foil transfer film cartridge is installed in the housing. The foil film information includes at least one item selected from a group comprising a color of the foil, a width of the foil film, and a widthwise position of the foil film in a direction of the width of the foil film. The controller causes the foil film information detected by the detector to be shown on the display.

10 Claims, 11 Drawing Sheets

(51) Int. Cl.
*B65H 7/02* (2006.01)
*B65H 7/20* (2006.01)

(52) U.S. Cl.
CPC ...... *B65H 2511/12* (2013.01); *B65H 2551/18* (2013.01); *B65H 2557/62* (2013.01); *B65H 2557/64* (2013.01); *B65H 2801/03* (2013.01)

(56) References Cited

U.S. PATENT DOCUMENTS

| | | | |
|---|---|---|---|
| 2013/0279952 | A1 | 10/2013 | Suzuki |
| 2013/0287455 | A1 | 10/2013 | Suzuki |
| 2013/0308992 | A1 | 11/2013 | Suzuki |
| 2017/0308014 | A1 | 10/2017 | Arai |
| 2018/0067710 | A1 | 3/2018 | Miyamoto |
| 2021/0349413 | A1 | 11/2021 | Hiramatsu et al. |

FOREIGN PATENT DOCUMENTS

| | | | |
|---|---|---|---|
| JP | 2002-366008 | A | 12/2002 |
| JP | 2008-194916 | A | 8/2008 |
| JP | 2013-076813 | A | 4/2013 |
| JP | 2013-237262 | A | 11/2013 |
| JP | 2013-242533 | A | 12/2013 |
| JP | 2013-256106 | A | 12/2013 |
| JP | 2014-029468 | A | 2/2014 |
| JP | 2017-149026 | A | 8/2017 |
| JP | 2017-194639 | A | 10/2017 |
| JP | 2018-030316 | A | 3/2018 |
| JP | 2018-039146 | A | 3/2018 |
| JP | 2018-069659 | A | 5/2018 |
| JP | 2020-117265 | A | 8/2020 |
| JP | 2020-122908 | A | 8/2020 |

OTHER PUBLICATIONS

Oct. 17, 2023—(JP) Notice of Reasons for Refusal—JP App 2020-065609, Eng Tran.

May 18, 2021—International Search Report—Intl App PCT/JP2021/011572.

* cited by examiner

FIG.6A

| | FIRST SENSOR | SECOND SENSOR |
|---|---|---|
| NOT INSTALLED | OFF | OFF |
| FC1 | ON | OFF |
| FC2 | OFF | ON |
| FC3 | ON | ON |

FIG.6B

| | THIRD SENSOR |
|---|---|
| GOLD | OFF |
| SILVER | ON |

FOIL TRANSFER DEVICE

REFERENCE TO RELATED APPLICATIONS

This application is a continuation application of International Application No. PCT/JP2021/011572 filed on Mar. 22, 2021 which claims priority from Japanese Patent Application No. 2020-065609 filed on Apr. 1, 2020. The disclosures of these applications are incorporated herein by reference in their entirety.

BACKGROUND ART

A foil transfer device known in the art transfers foil onto a sheet, and is configured to display an error message when a determination is made to interrupt foil transfer.

DESCRIPTION

It is conceivable to choose a type of cartridge from different types of cartridges including foil films having different widths and/or widthwise positions and to install a cartridge of the chosen type into a housing of a foil transfer device to execute foil transfer according to the chosen type of the installed cartridge. However, a user cannot view the cartridge after the cartridge is installed therein. Thus, in order to execute foil transfer according to the type of the cartridge, it would be necessary to open a cover of the housing to check the type of the cartridge installed in the housing. Therefore, desired foil transfer according to the type of the cartridge installed in the housing cannot be performed easily.

It would be desirable to provide a foil transfer device that can easily perform foil transfer in a desired manner according to the type of the cartridge installed therein.

In one aspect, a foil transfer device for transferring foil onto a sheet laid on a foil film containing the foil is disclosed. The foil transfer device comprises a foil transfer film cartridge, a housing, a display, a detector, and a controller. The foil transfer film cartridge includes a supply reel on which the foil film is wound. The housing allows the foil transfer film cartridge to be removably installed therein. The display is provided on an outer surface of the housing to display information. The detector detects foil film information in a state where the foil transfer film cartridge is installed in the housing. The foil film information includes at least one item selected from a group comprising a color of the foil, a width of the foil film, and a widthwise position of the foil film in a direction of the width of the foil film. The controller causes the foil film information detected by the detector to be shown on the display.

According to this configuration, since it is possible to find out the state of the foil film from the foil film information shown on the display, foil transfer can be easily performed in a desired manner without visually checking the foil transfer film cartridge installed in the housing to confirm the type of the cartridge installed therein.

The detector may comprise a first actuator configured to be movable, a first sensor configured to detect a position of the first actuator, a second actuator configured to be movable and a second sensor configured to detect a position of the second actuator. The foil transfer film cartridge may be configured to push at least one of the first actuator and the second actuator selectively according to the foil film information when the foil transfer film cartridge is being installed in the housing.

The foil transfer film cartridge may comprise a memory that stores the foil film information, and the detector may be configured to read the foil film information stored in the memory.

The controller may be configured to cause the width of the foil film to be shown on the display as an item of the foil film information.

The controller may be configured to cause the widthwise position of the foil film to be shown on the display as an item of the foil film information.

The display may be capable of showing a plurality of unit images aligned in a predetermined direction, and the controller may be configured to change the number and position of the unit images shown on the display based on the width and the widthwise position of the foil film.

According to this configuration, since it is possible to display both of the width and the widthwise position of the foil film by the number and position of unit images aligned in the predetermined direction, the space for displaying foil film information can be reduced compared to the case where, for example, the width and the widthwise position of the foil film are respectively displayed by letters. Thus, the size of the display can be reduced.

The controller may be configured to change the information shown on the display based on an input operation of a user in a standby state in which foil transfer is not executed.

The controller may be configured to cause the foil film information to be shown on the display based on an input operation of a user.

The foil transfer device may further comprise a shortcut key, and the controller may be configured to change a foil transfer setting from a first foil transfer setting established as a default setting to a second foil transfer setting different from the first foil transfer setting, based on an input operation of a user, store the second foil transfer setting in such a manner that the second foil transfer setting is linked to the shortcut key, and establish the second foil transfer setting as the foil transfer setting in response to the shortcut key being operated.

The housing may comprise a housing main body having an opening, and a cover that openably covers the opening, and the display may be provided on an outer surface of the cover.

The above and other aspects, their advantages and further features will become more apparent by describing in detail illustrative, non-limiting embodiments thereof with reference to the accompanying drawings briefly described below:

FIG. 6A is a table used for detecting a type of the foil transfer film cartridge.

FIG. 6B is a table used for detecting a color of a foil.

A detailed description will be given of an example of a foil transfer device with reference made to the drawings where appropriate. In the following description, directions will be explained by the directions shown in FIG. 1A. That is, the right side of FIG. 1A will be referred to as "front", the left side of FIG. 1A will be referred to as "rear", the forward side of the sheet of FIG. 1A will be referred to as "left", and the rearside of the sheet of FIG. 1A will be referred to as "right". Upward and downward in FIG. 1A will be referred to as "up and down (upward and downward)".

Figure 1A:
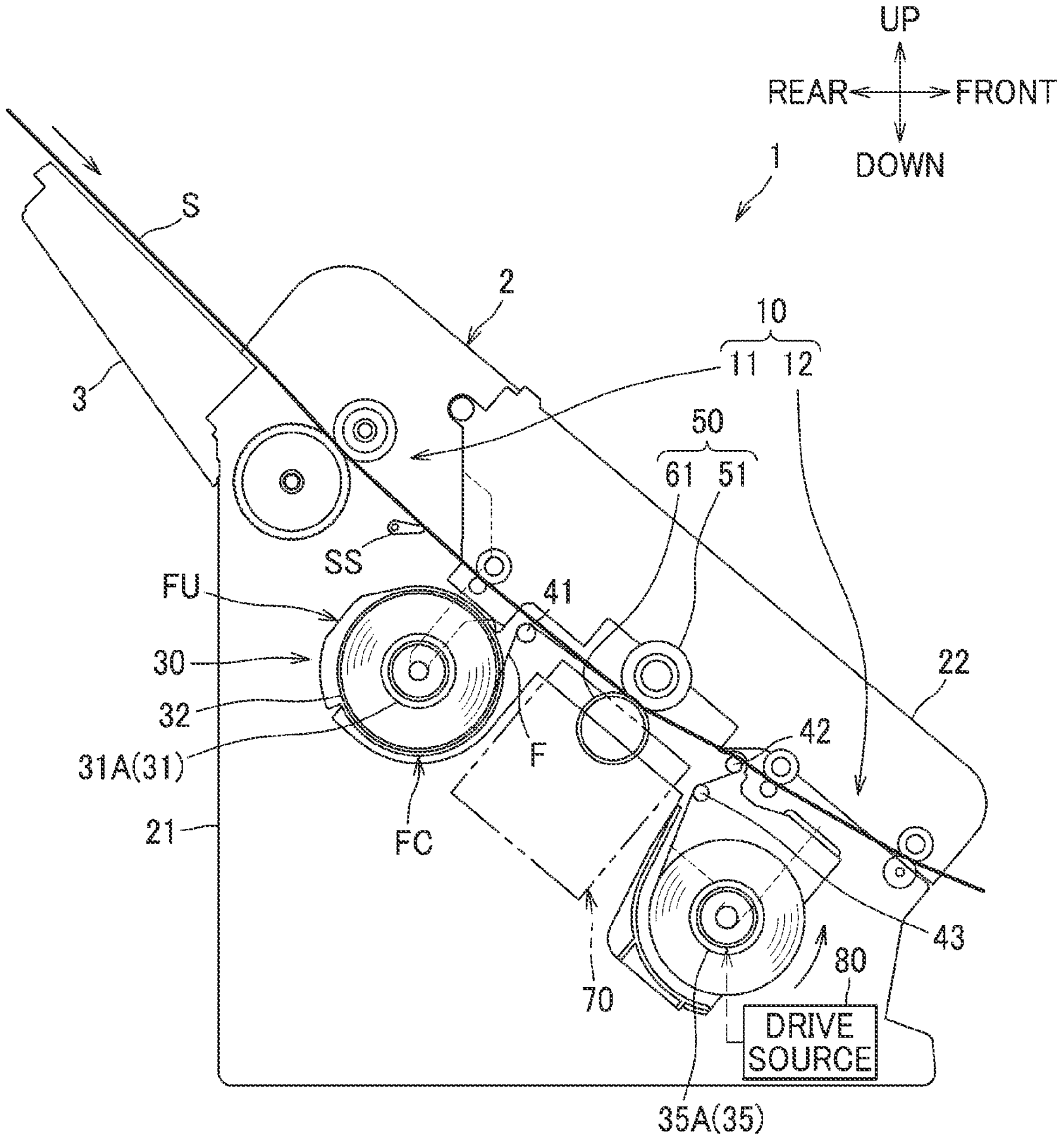
FIG. 1A is an illustration showing a foil transfer device.

As shown in FIG. 1A, a foil transfer device 1 is a device for transferring foil containing aluminum or the like onto a toner image formed on a sheet S by an image forming apparatus such as, for example, a laser printer or the like. The foil transfer device 1 comprises a housing 2, a sheet tray 3, a sheet conveyor unit 10, a film supply unit 30, and a transfer unit 50.

The housing 2 is made of plastic or the like, and comprises a housing main body 21 and a cover 22. The housing main body 21 has an opening 21A (see FIG. 2) at an upper portion thereof. The opening 21A allows a film unit FU which will be described below to be removably installed in the housing main body 21. The opening 21A faces upward. The cover 22 is a member for opening and closing the opening 21A. The cover 22 has a rear end rotatably supported by the housing main body 21.

The sheet tray 3 is a tray on which sheets S of paper, OHP film, etc. are placed. The sheet tray 3 is provided at a rear part of the housing 2. Each sheet S is placed on the sheet tray 3 with a surface on which a toner image is formed facing downward.

The sheet conveyor unit 10 comprises a sheet feed mechanism 11 and a sheet ejection mechanism 12. The sheet feed mechanism 11 is a mechanism that conveys sheets S on the sheet tray 3 one by one toward the transfer unit 50. The sheet ejection mechanism 12 is a mechanism that ejects a sheet S having passed through the transfer unit 50, to the outside of the housing 2.

The film supply unit 30 is a unit that supplies and lays a foil film F on a sheet S conveyed from the sheet feed mechanism 11. The film supply unit 30 comprises the film unit FU, and a drive source 80 such as a motor or the like.

Figure 2:
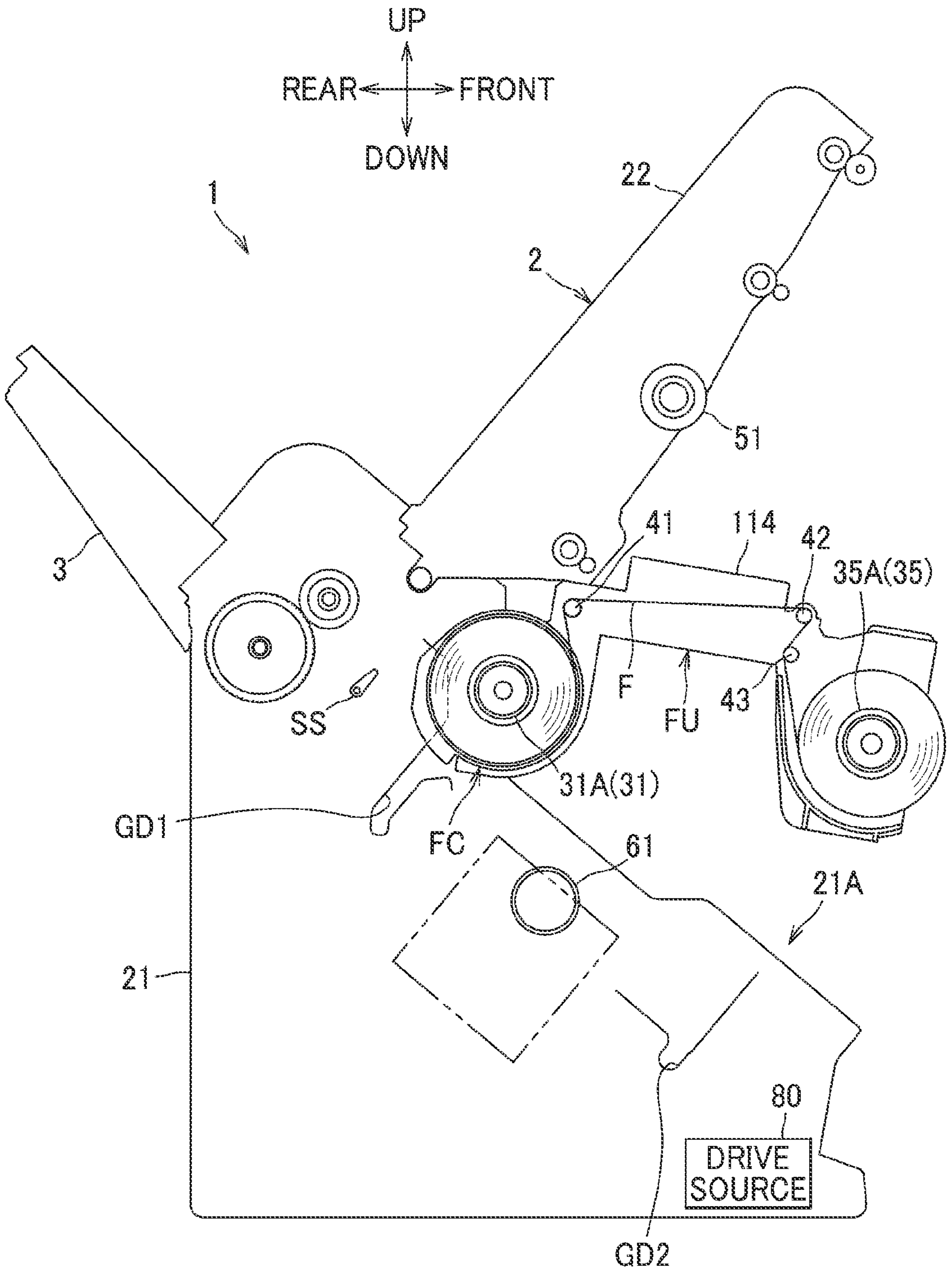
FIG. 2 is an illustration showing the foil transfer device with a cover open.

The film unit FU is configured, as shown in FIG. 2, to be removably installable into the housing main body 21 from above. The film unit FU comprises a supply reel 31, a take-up reel 35, a first guide shaft 41, a second guide shaft 42, and a third guide shaft 43. The foil film F is wound on the supply reel 31 of the film unit FU.

Figure 1B:
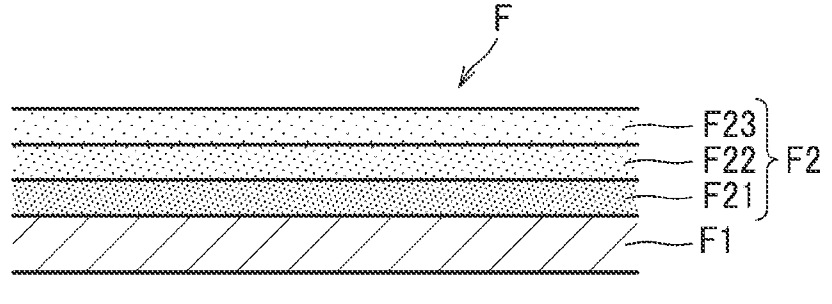
FIG. 1B is a section view showing a configuration of a foil film.

As shown in FIG. 1B, the foil film F comprises a supporting layer F1 and a supported layer F2. The supporting layer F1 is a transparent substrate in the form of a tape made of polymeric material and supports the supported layer F2.

The supported layer F2 comprises a release layer F21, a transfer layer F22, and an adhesive layer F23. The release layer F21 is a layer for facilitating separation of the transfer layer F22 from the supporting layer F1, and is interposed between the supporting layer F1 and the transfer layer F22. The release layer F21 contains a transparent material, such as a wax-type resin, easily releasable from the supporting layer F1.

The transfer layer F22 is a layer to be transferred onto a toner image, and contains foil. Foil is a thin sheet of metal such as gold, silver, copper, aluminum, etc. The transfer layer F22 contains a colorant of gold-colored, silver-colored, red-colored, or other colorant, and a thermoplastic resin. The transfer layer F22 is interposed between the release layer F21 and the adhesive layer F23.

The adhesive layer F23 is a layer for facilitating adhesion of the transfer layer F22 to a toner image. The adhesive layer F23 contains a material, for example, such as vinyl chloride resin or acrylic resin, which tends to adhere to a toner image heated by the transfer unit 50 which will be described below.

As shown in FIG. 1A, the supply reel 31 is made of plastic or the like, and includes a supply shaft 31A on which the foil film F is wound. The take-up reel 35 is made of plastic or the like, and includes a take-up shaft 35A on which to take up the foil film F.

It is to be understood that in FIG. 1A and other figures, the foil film F is shown as to be wound on both of the supply reel 31 and the take-up reel 35 in a roll of a maximum diameter for the sake of convenience. In actuality, the film unit FU in a new condition has its foil film F wound on the supply reel 31 in a roll of a maximum diameter, while no foil film F is wound on the take-up reel 35, or the foil film F is wound on the take-up reel 35 in a roll of a minimum diameter. When the film unit FU is at the end of its life (the foil film F has been exhausted), the foil film F is wound on the take-up reel 35 in a roll of a maximum diameter, while no foil film F is wound on the supply reel 31, or the foil film F is wound on the supply reel 31 in a roll of a minimum diameter.

The first guide shaft 41, the second guide shaft 42, and the third guide shaft 43 are shafts for changing the traveling direction of the foil film F. The first guide shaft 41, the second guide shaft 42, and the third guide shaft 43 are made of SUS (stainless steel) or the like.

The first guide shaft 41 is located upstream of the transfer unit 50 in a direction of conveyance of a sheet S. The first guide shaft 41 changes the traveling direction of the foil film F drawn out from the supply reel 31 to a direction approximately parallel to the direction of conveyance of the sheet S.

The foil film F guided by the first guide shaft 41 is conveyed to the transfer unit 50 with its supported layer F2 (see FIG. 1B) facing upward. The sheet S is laid on the foil film F with the supported layer F2 facing upward, and conveyed to the transfer unit 50 together with the foil film F.

The second guide shaft 42 is located downstream of the transfer unit 50 in the direction of conveyance of the sheet S. The second guide shaft 42 changes the traveling direction of the foil film F having passed through the transfer unit 50 to a direction different from the direction of conveyance of the sheet S and peels the foil film F off from the sheet S.

The third guide shaft 43 defines the angle of the foil film F at which the foil film F is peeled off from a sheet S (also referred to as "peeling angle" in the following description). Herein, the peeling angle is an angle formed by portions of the multilayer film F extended and stretched between the first guide shaft 41 and the second guide shaft 42, and extended and stretched between the second guide shaft 42 and the third guide shaft 43. The third guide shaft 43 changes the traveling direction of the foil film F guided by the second guide shaft 42 and guides the foil film F to the take-up reel 35.

In a state where the film unit FU is installed in the foil transfer device 1, the take-up reel 35 is driven to rotate in a counterclockwise direction in the drawings by the drive source 80 provided in the housing 2. When the take-up reel 35 rotates, the foil film F wound around the supply reel 31 is drawn out, and the drawn-out foil film F is guided by each of the guide shafts 41 to 43 and taken up on the take-up reel 35. Specifically, in a foil transfer process, the foil film F is drawn out from the supply reel 31 as the foil film F is conveyed forward by a pressure roller 51 and a heating roller 61 which will be described below. The foil film F conveyed forward by the pressure roller 51 and the heating roller 61 is taken up on the take-up reel 35.

The transfer unit 50 is a unit that heats and applies pressure to a sheet S and the foil film F laid on each other, to transfer the transfer layer F22 onto a toner image formed on the sheet S. The transfer unit 50 comprises a pressure roller 51 and a heating roller 61. The transfer unit 50 applies heat and pressure to the sheet S and the foil film F laid on each other in a nip region between the pressure roller 51 and the heating roller 61.

The pressure roller 51 is a roller comprised of a cylindrical metal core with its cylindrical surface coated with a rubber layer made of silicone rubber. The pressure roller 51 is located above the foil film F, and is contactable with a reverse side (opposite to a side on which a toner image is formed) of the sheet S.

The pressure roller 51 has end portions rotatably supported by the cover 22. The pressure roller 51 nips the sheet S and the foil film F in combination with the heating roller 61, and is driven to rotate by the drive source 80, causing the heating roller 61 to rotate accordingly.

The heating roller 61 is a roller comprised of a metal tube formed in a cylindrical shape including a heater therein. The heating roller 61 heats the foil film F and the sheet S. The heating roller 61 is located under the foil film F and contacts the foil film F.

In this example, a contact/separation mechanism 70 moves the heating roller 61 into and out of contact with the foil film F. The contact/separation mechanism 70 is located between the supply reel 31 and the take-up reel 35 in the direction of conveyance of a sheet S. When the cover 22 is closed, the contact/separation mechanism 70 moves the heating roller 61 to a contact position in which the heating roller 61 contacts the foil film F each time a sheet S is fed to the transfer unit 50. When the cover 22 is open or when foil transfer is not executed on a sheet S at the transfer unit 50, contact/separation mechanism 70 positions the heating roller 61 in a separate position separated apart from the foil film F.

The foil transfer device 1 further comprises a sheet sensor SS that detects a sheet S passing thereby. The sheet sensor SS is located upstream of the heating roller 61 in the direction of conveyance of a sheet S. The sheet sensor SS comprises, for example, a swing lever that swings when pushed by a sheet S being conveyed, and an optical sensor that detects the position of the swing lever.

With the foil transfer device 1 configured as described above, sheets S placed on the sheet tray 3 with front surfaces facing downward are conveyed by the sheet feed mechanism 11 toward the transfer unit 50. Each sheet S is laid on the foil film F supplied from the supply reel 31 at a position upstream of the transfer unit 50 in the conveyance direction of the sheet S, and conveyed to the transfer unit 50 with a toner image of the sheet S being kept in contact with the foil film F.

In the transfer unit 50, the heating roller 61 and the pressure roller 51 apply heat and pressure to the sheet S and the foil film F passing through the nip region between the pressure roller 51 and the heating roller 61, so that foil (supported layer F2) is transferred onto the toner image.

After foil is transferred, the sheet S and the foil film F adhered to each other are conveyed to the second guide shaft 42. When the sheet S and the foil film F travel past the second guide shaft 42, the direction of conveyance of the foil film F is changed to a direction different from the direction of conveyance of the sheet S; thereby the foil film F is peeled off from the sheet S, i.e., the supported layer F2 adhered to the toner image is peeled off from the supporting layer F1 of the foil film F.

The foil film F peeled off from the sheet S and including the supporting layer F1 peeled off from the supported layer F2 adhered to the toner image on the sheet S is taken up on the take-up reel 35. On the other hand, the sheet S from which the foil film F is peeled off is ejected by the sheet ejection mechanism 12 to the outside of the housing 2, with its foil transferred surface facing downward.

Next, the film unit FU will be described with reference made to FIG. 3 and FIG. 4.

Figure 3:
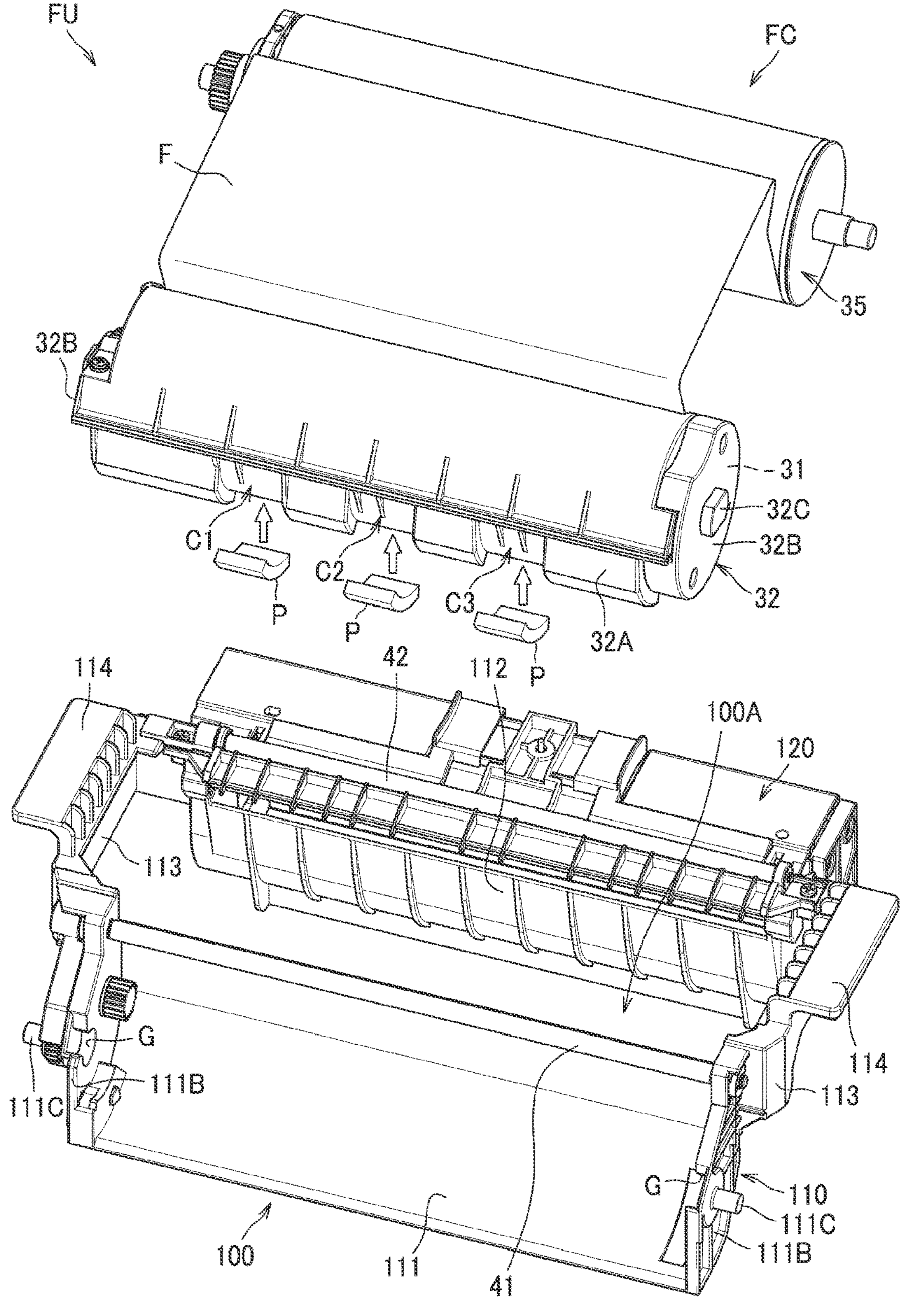
FIG. 3 is an exploded perspective view of a film unit.

As shown in FIG. 3, the film unit FU comprises a holder 100 made of plastic or the like, and a foil transfer film cartridge FC installable into and removable from the holder 100. The foil transfer film cartridge FC comprises the supply reel 31 and the take-up reel 35 described above, and a supply case 32. The foil transfer film cartridge FC attached to the holder 100 is installable into and removable from the housing main body 21 through the opening 21A of the housing main body 21.

The supply reel 31 (specifically, the supply case 32) and the take-up reel 35 are installable into and removable from the holder 100 in a direction perpendicular to an axial direction of the supply reel 31.

The supply case 32 is a hollow case accommodating the supply reel 31. The supply case 32 is made of plastic or the like, and includes an outer peripheral wall 32A having an approximately cylindrical shape, and two side walls 32B each having an approximately circular disc shape and provided at both ends of the outer peripheral wall 32A. The supply reel 31 is rotatably supported by the respective side walls 32B of the supply case 32.

The outer peripheral wall 32A includes a first concave portion C1, a second concave portion C2, and a third concave portion C3 that are formed side by side in the axial direction of the supply reel 31. Engagement pieces P which serve as identifiers can be selectively fixed in each of the concave portions C1 to C3. Specifically, an engagement piece P is fixed to at least one of the first concave portion C1 and the second concave portion C2 based on a width and a widthwise position of the foil film F. Further, an engagement piece P is selectively fixed to the third concave portion C3 according to a color of the foil.

Each of the side walls 32B includes an engagement portion 32C having an elongate shape as viewed in the axial direction of the supply reel 31. The engagement portions 32C are portions to be guided by installation/removal guides G of the holder 100 which will be described below, and are each formed in a shape of a rounded corner rectangle.

The holder 100 comprises a base frame 110 and a rotating frame 120 rotatably (movably) supported by the base frame 110.

The first guide shaft 41 and the second guide shaft 42 described above are rotatably supported by the base frame 110. The base frame 110 includes a first holding portion 111, a second holding portion 112, two connecting portions 113 and two handles 114.

The third guide shaft 43 is rotatably supported by the rotating frame 120 (such configuration not shown in the drawings).

The first holding portion 111 is a portion that holds the supply case 32. The first holding portion 111 holds the supply reel 31 via the supply case 32.

The first holding portion 111 includes two side walls 111B. Each side wall 111B has an installation/removal guide G for guiding the supply case 32 along a predetermined direction when the supply case 32 is installed and removed.

Each side wall 111B includes a boss 111C on an outer surface thereof. The bosses 111C are portions to be guided by first guides GD1 (see FIG. 2) formed in the housing main body 21 when the film unit FU is installed into and removed from the housing main body 21.

The second holding portion 112 is a portion that holds the take-up reel 35. To be more specific, the second holding portion 112 forms a hollow case with the rotating frame 120, and the take-up reel 35 is accommodated in the hollow case. The take-up shaft 35A of the take-up reel 35 protrudes in the axial direction from the second holding portion 112 and the rotating frame 120 to be guided by second guides GD2 (see FIG. 2) formed in the housing main body 21

The two connecting portions 113 are portions that connect the first holding portion 111 and the second holding portion 112. The connecting portions 113 are arranged apart from each other in the axial direction of the supply reel 31. With the connecting portions 113 being formed in this way, the holder 100 is provided with a through hole 100A extending in an perpendicular direction perpendicular to the axial direction of the supply reel 31. In this way, the heating roller 61 moved by the contact/separation mechanism 70 described above can move into or out of contact with the foil film F through the through hole 100A. Each handle 114 is provided on a corresponding connecting portion 113.

Various foil transfer film cartridges FC of foils of different colors, foil films F of different widths, and/or foil films F of different widthwise positions in directions of widths of the foil films F can be installed in the holder 100. For example, a first foil transfer film cartridge FC1, a second foil transfer film cartridge FC2, or a third foil transfer film cartridge FC3, shown in FIG. 4, can be installed in the holder 100.

Figure 4A:
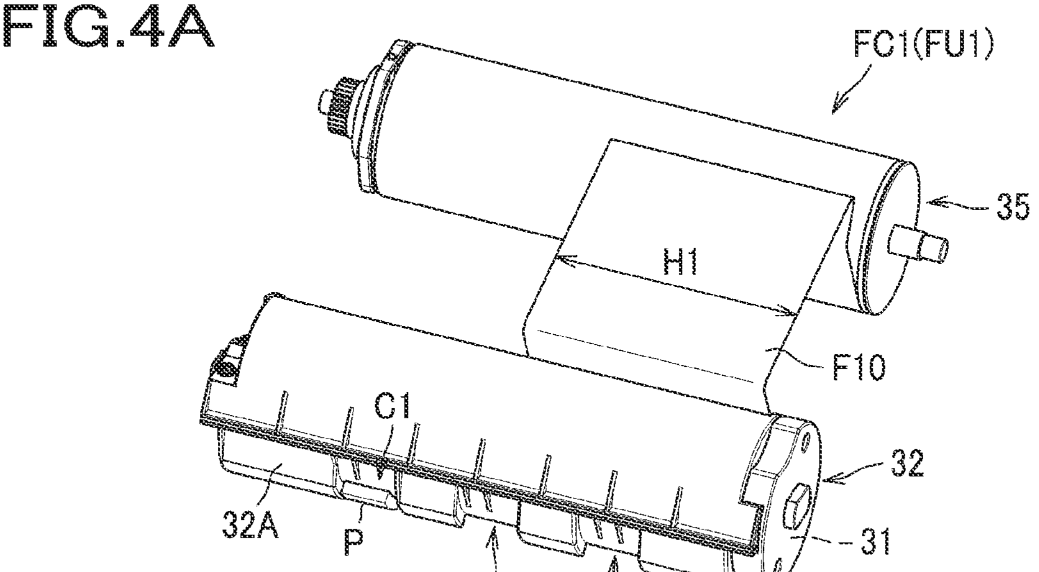
FIG. 4A is a perspective view of a first foil transfer film cartridge.

As shown in FIG. 4A, the first foil transfer film cartridge FC1 includes a first foil film F10 having a first width H1 and located in a widthwise position shifted to one side in a direction of the width of the foil film F (widthwise direction). The first foil transfer film cartridge FC1 installed in the foil transfer device 1 holds the first foil film F10 in such a manner that the first foil film F10 is located closer to one end of the heating roller 61 than the other end of the heating roller 61. The first width H1 is smaller than a width of a sheet S having the maximum width of sheets S that can be used in the foil transfer device 1. In one example, the first width H1 is 110 mm (half the width of the third width H3 which will be described below).

In the first foil transfer film cartridge FC1, the engagement piece P is only fixed to the first concave portion C1, i.e., one of the first concave portion C1 and the second concave portion C2. Further, the engagement piece P is not fixed if the color of the foil is gold, but is fixed if the color of the foil is silver, to the third concave portion C3. The selective fixing of the engagement piece P to the third concave portion C3 may apply in the second foil transfer film cartridge FC2 and the third foil transfer film cartridge FC3.

Figure 4B:
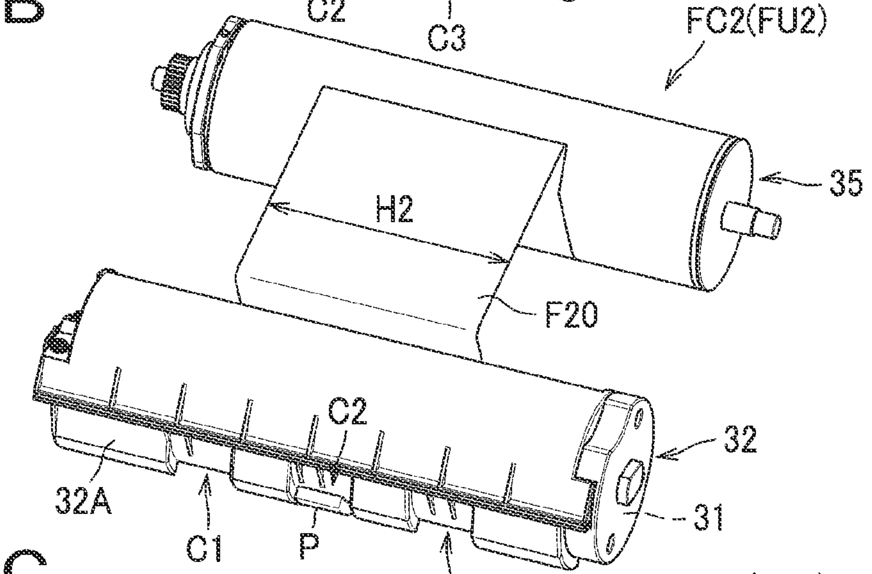
FIG. 4B is a perspective view of a second foil transfer film cartridge.

As shown in FIG. 4B, the second foil transfer film cartridge FC2 includes a second foil film F20 having a second width H2 and located in a widthwise position shifted to the center in the widthwise direction. The second foil transfer film cartridge FC2 installed in the foil transfer device 1 holds the second foil film F20 in such a manner that the second foil film F20 is located in the center of the heating roller 61 in an axial direction of the heating roller 61. The second width H2 is smaller than the width of a sheet S having the maximum width of sheets S that can be used in the foil transfer device 1. In one example, the second width H2 is 110 mm (half the width of the third width H3 which will be described below).

In the second foil transfer film cartridge FC2, the engagement piece P is only fixed to one concave portion, specifically the second concave portion C2, of the first concave portion C1 and the second concave portion C2.

Figure 4C:
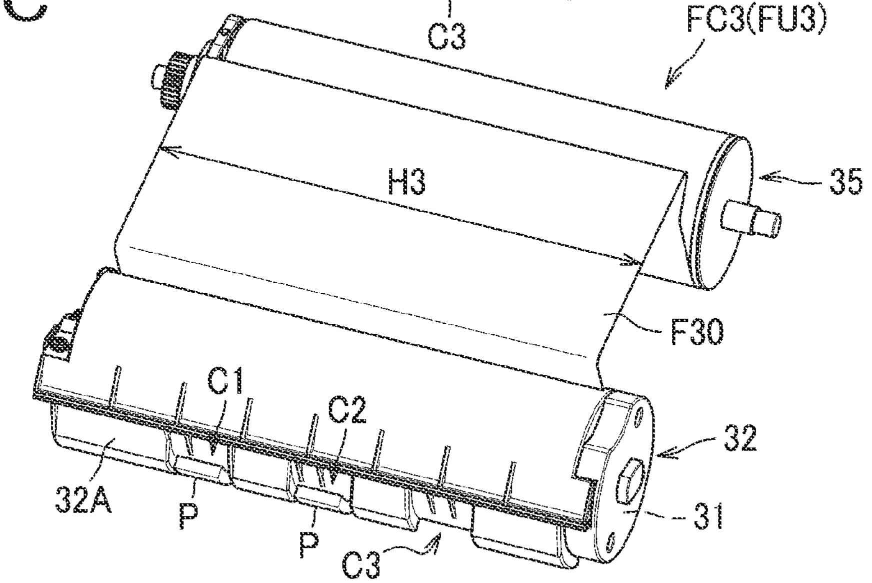
FIG. 4C is a perspective view of a third foil transfer film cartridge.

As shown in FIG. 4C, the third foil transfer film cartridge FC3 includes a third foil film F30 having a third width H3. The third foil transfer film cartridge FC3 installed in the foil transfer device 1 holds the third foil film F30 in such a manner that the third foil film F30 extends from one end to the other end of the heating roller 61. The third width H3 is the maximum width of a foil film F that can be placed in the film unit FU. In other words, the third width H3 is larger than the width of a sheet S having the maximum width of sheets S that can be used in the foil transfer device 1. In one example, the third width H3 is 220 mm.

In the third foil transfer film cartridge FC3, engagement pieces P are fixed to both of the first concave portion C1 and the second concave portion C2.

In the following description, the film unit FU with the first foil transfer film cartridge FC1 installed therein is also referred to as first film unit FU1. Similarly, the film unit FU with the second foil transfer film cartridge FC2 installed therein is also referred to as second film unit FU2, and the film unit FU with the third foil transfer film cartridge FC3 installed therein is also referred to as third film unit FU3.

Figure 5A:
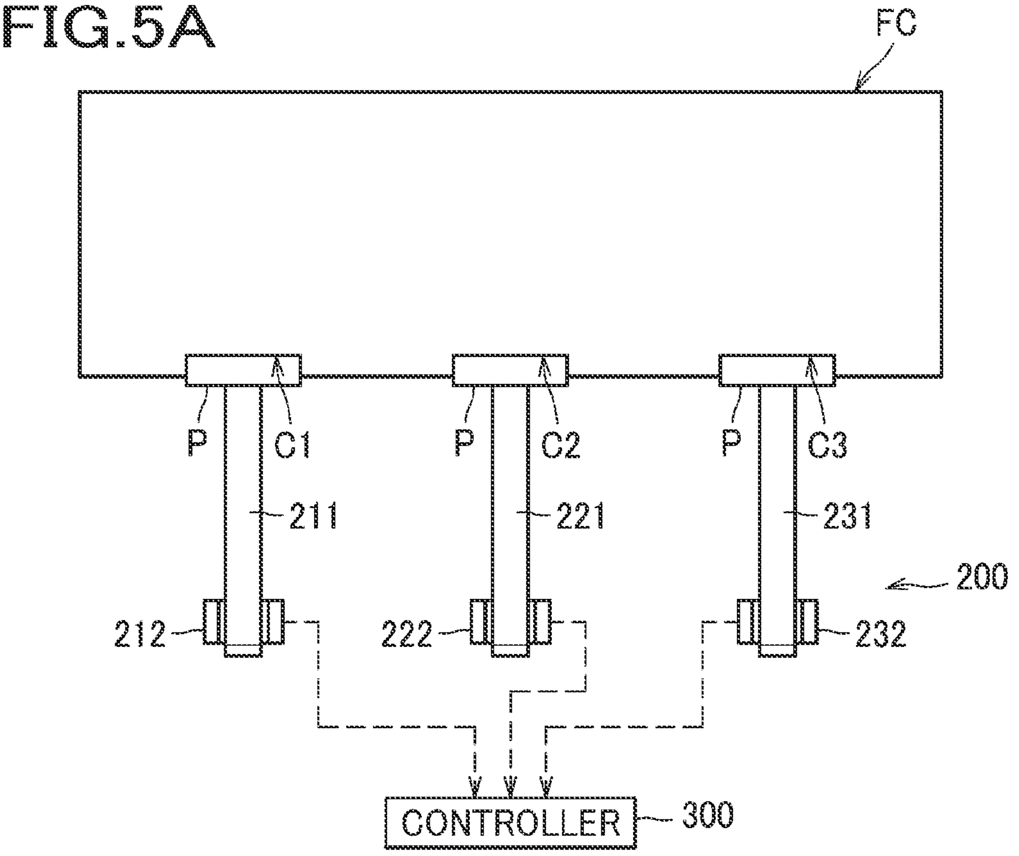
FIG. 5A is an illustration showing the relation between a foil transfer film cartridge and a detector.

The first film unit FU1, the second film unit FU2, and the third film unit FU3 which are described above can be selectively installed into or removed from the housing main body 21. In other words, the first foil transfer film cartridge FC1, the second foil transfer film cartridge FC2, and the third foil transfer film cartridge FC3 can be selectively installed into or removed from the housing main body 21 via the holder 100. In the following description, the foil transfer film cartridge FC being installed into and removed from the housing main body 21 via the holder 100 is also referred to simply as "the foil transfer film cartridge FC being installed into and removed from the housing main body 21". As shown in FIG. 5A, the foil transfer device 1 further comprises a detector 200 and a controller 300.

The detector 200 is a unit for acquiring foil film information in a state where the foil transfer film cartridge FC is installed in the housing main body 21. The foil film information includes information that indicates a color of the foil, a width of the foil film F, and a widthwise position of the foil film F in the widthwise direction. The detector 200 comprises a first actuator 211, a first sensor 212, a second actuator 221, a second sensor 222, a third actuator 231, and a third sensor 232.

The first actuator 211 is located in a position corresponding to the first concave portion C1 of the foil transfer film cartridge FC installed in the housing main body 21. The second actuator 221 is located in a position corresponding to the second concave portion C2 of the foil transfer film cartridge FC installed in the housing main body 21. The third actuator 231 is located in a position corresponding to the third concave portion C3 of the foil transfer film cartridge FC installed in the housing main body 21.

Since each of the actuators 211, 221, 231 has a similar structure, the structure of the first actuator 211 will be described as an illustrative structure and descriptions of the structures of the actuators 221, 231 will be omitted.

Figure 5B:
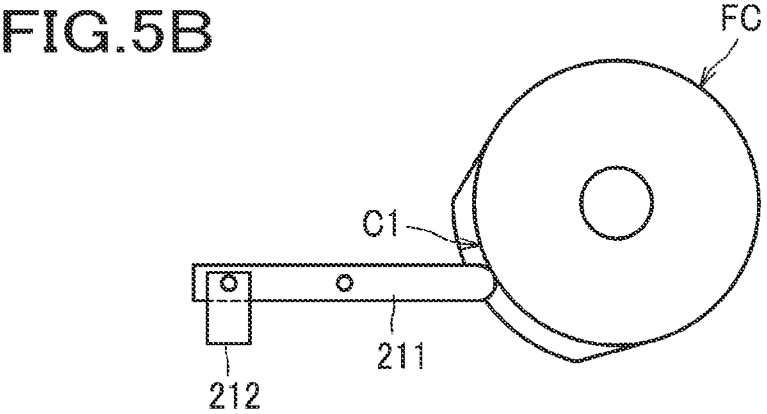
FIG. 5B is an illustration showing a first actuator in a first position with respect to a first sensor and the foil transfer film cartridge.
Figure 5C:
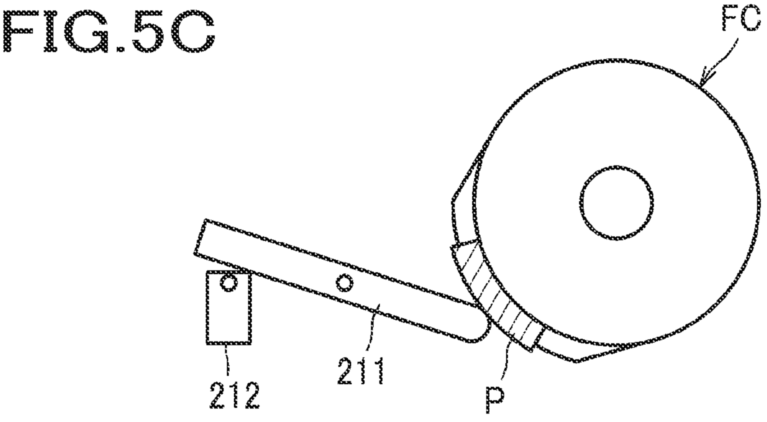
FIG. 5C is an illustration showing the first actuator in a second position with respect to the first sensor and the foil transfer film cartridge.

The first actuator 211 is configured to be rotatable between a first position shown in FIG. 5B and a second position shown in FIG. 5C. The first actuator 211 is pushed by the engagement piece P fixed to the first concave portion C1 and rotates from the first position to the second positon when the foil transfer film cartridge FC with the engagement piece P fixed to the first concave portion C1 is being installed in the housing main body 21. The first actuator 211 is not pushed by the foil transfer film cartridge FC and remains in the first position when the foil transfer film cartridge FC with no engagement piece P fixed to the first concave portion C1 is being installed in the housing main body 21.

Herein, the engagement piece P fixed to the first concave portion C1 corresponds to a first pushing portion configured to push the first actuator 211 when the foil transfer film cartridge FC is being installed in the housing main body 21. Similarly, the engagement piece P fixed to the second concave portion C2 corresponds to the second pushing portion configured to push the second actuator 221 when the foil transfer film cartridge FC is being installed in the housing main body 21.

Each of the sensors 212, 222, 232 is a sensor for detecting a position of a corresponding actuator 211, 221, 231. Since each of the sensors 212, 222, 232 has a similar structure, the structure of the first sensor 212 will be described as an illustrative structure and descriptions of the structures of the sensors 222, 232 will be omitted.

The first sensor 212 is an optical sensor comprising a light-emitting element and a light-receiving element. In this example, when the first actuator 211 is located in the first position, light emitted from the light-emitting element is blocked by the first actuator 211 which causes the first sensor 212 to assume an off state in which a signal is not outputted from the first sensor 212. When the first actuator 211 is located in the second position, light emitted from the light-emitting element is received by the light-receiving element which causes the first sensor 212 to assume an on state in which a signal is outputted from the first sensor 212.

The controller 300 determines the type or other information of the foil transfer film cartridge FC from the combination of signals outputted from each of the sensors 212, 222, 232. To be more specific, as shown in FIG. 6A, if the first sensor 212 and the second sensor 222 are both off, the controller 300 determines that a foil transfer film cartridge FC is not installed in the housing main body 21.

If the first sensor 212 is on and the second sensor 222 is off, the controller 300 determines that the first foil transfer film cartridge FC1 is installed in the housing main body 21. If the first sensor 212 is off and the second sensor 222 is on, the controller 300 determines that the second foil transfer film cartridge FC2 is installed in the housing main body 21. If the first sensor 212 and the second sensor 222 are both on, the controller 300 determines that the third foil transfer film cartridge FC3 is installed in the housing main body 21.

Figure 7A:
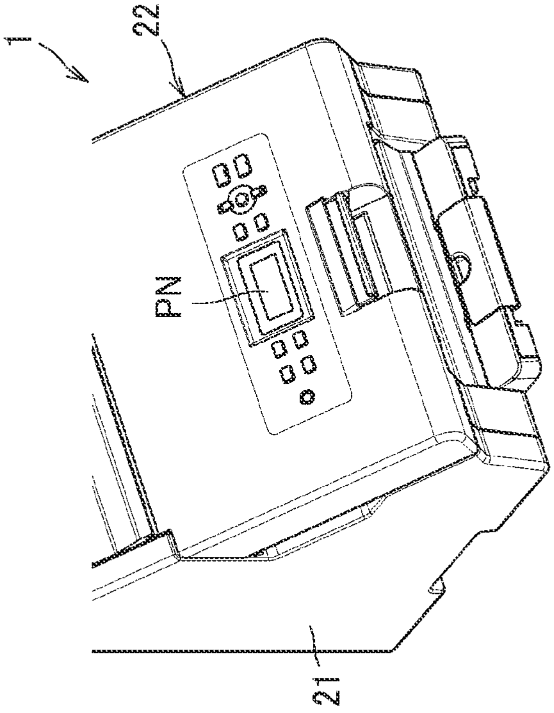
FIG. 7A is a perspective view of a display and other components provided on an outside surface of the foil transfer device.
Figure 7B:
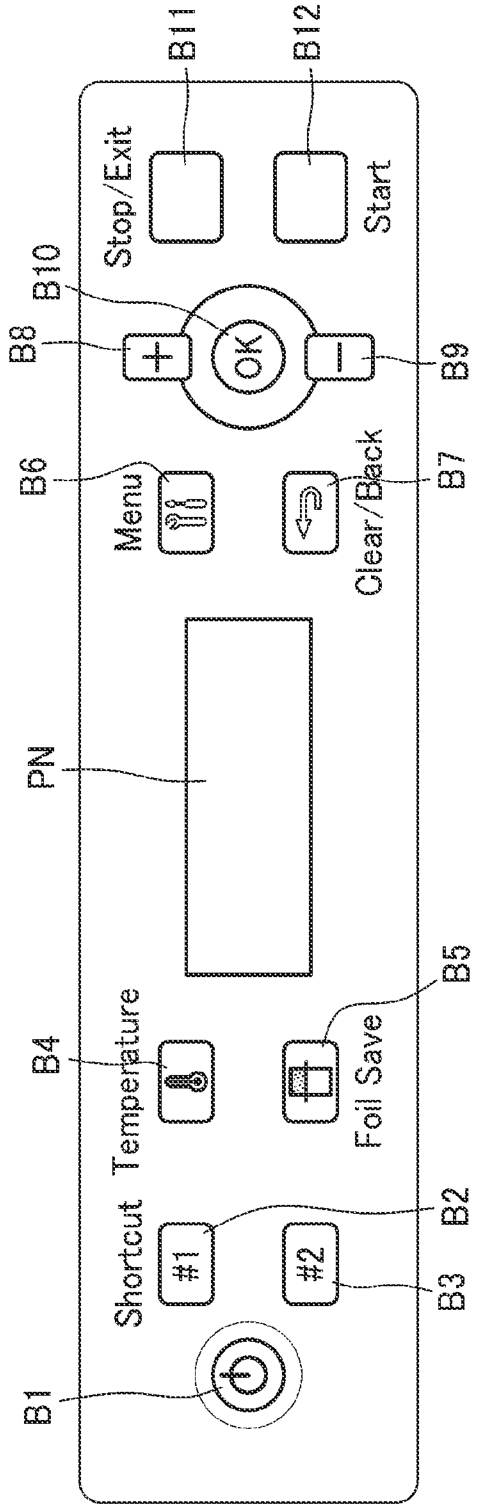
FIG. 7B is a plan view of the display and other components provided on the outer surface of the foil transfer device.

Further, as shown in FIG. 6B, if the third sensor 232 is off, the controller 300 determines that the color of the foil is gold. If the third sensor 232 is on, the controller 300 determines that the color of the foil is silver As shown in FIG. 7A and FIG. 7B, the foil transfer device 1 further comprises a display PN and a variety of switches B1 to B12. The display PN and the variety of switches B1 to B12 are provided on an outside surface of the cover 22.

Figure 8A:
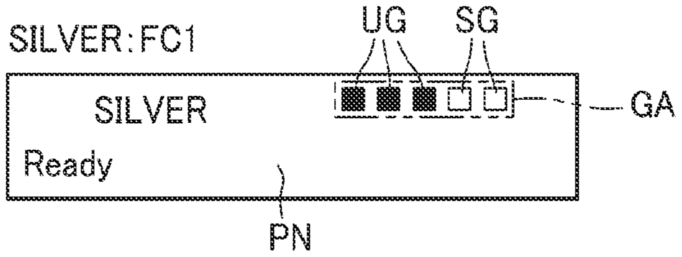
FIG. 8A is an illustration of information shown on the display when the first foil transfer film cartridge with silver foil is installed in the housing.
Figure 8B:
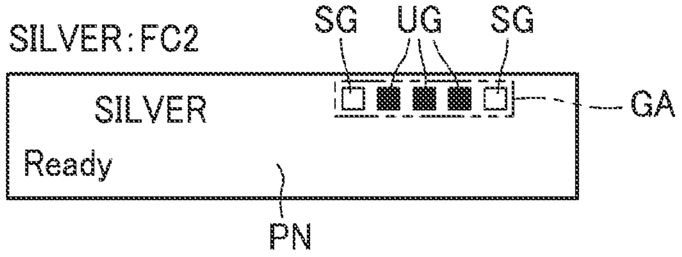
FIG. 8B is an illustration of information shown on the display when the second foil transfer film cartridge with silver foil is installed in the housing.
Figure 8C:
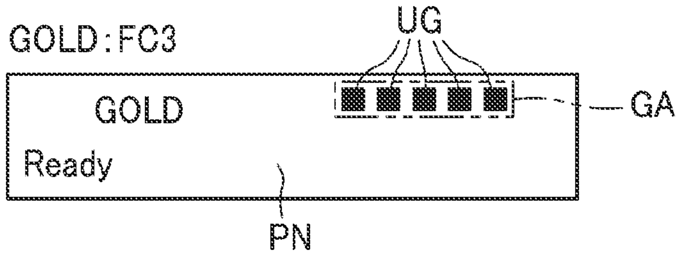
FIG. 8C is an illustration of information shown on the display when the third foil transfer film cartridge with gold foil is installed in the housing.

The display PN is a liquid crystal panel or the like, and has a function of displaying information. As shown in FIGS. 8A to 8C, the controller 300 has a function of causing the foil film information detected by the detector 200 to be shown on the display PN.

To be more specific, if it is determined that the first foil transfer film cartridge FC1 with silver foil is installed in the housing 2, the controller 300 causes the image shown in FIG. 8A to be shown on the display PN. If it is determined that the second foil transfer film cartridge FC2 with silver foil is installed in the housing 2, the controller 300 causes the image shown in FIG. 8B to be shown on the display PN. If it is determined that the third foil transfer film cartridge FC3 with gold foil is installed in the housing 2, the controller 300 causes the image shown in FIG. 8C to be shown on the display PN.

Specifically, the controller 300 causes an image of letters "SILVER" or "GOLD" to be displayed at the upper left portion of the display PN as the foil film information indicating a color of the foil. The controller 300 also causes a plurality of unit images UG to be displayed at the upper right portion of the display PN as the foil film information indicating the width and widthwise position of the foil film F.

The controller 300 causes a plurality of unit images UG aligned in a predetermined direction, specifically, in the left-right direction, to be shown on the display PN. The controller 300 changes the number and location of the unit images UG shown on the display PN in accordance with the width and widthwise position of the foil film F.

Specifically, if the width of the foil film F is the first width H1 or the second width H2, the controller 300, as shown in FIG. 8A and FIG. 8B, causes three unit images UG to be shown on the display PN. If the width of the foil film F is the third width H3, the controller 300, as shown in FIG. 8C, causes five unit images UG to be shown on the display PN.

If the foil film F is located at one side in the widthwise direction, the controller 300, as shown in FIG. 8A, causes three unit images UG to be shown shifted to one side in the left-right direction within the image area GA in which the maximum number of unit images UG, i.e., five unit images UG can be displayed. In this example, the image area GA is an imaginary area that defines the width of a sheet S and is not seen on the display PN. Therefore, in order to indicate that three unit images UG are shifted to one side in the left-right direction, the controller 300 causes two auxiliary images SG to be shown on the other side. The unit image UG and the auxiliary image SG only need to be different. In this example, the unit image UG is an image of a filled-in rectangular box, and the auxiliary image SG is an image of an outline of a rectangular box.

When the foil film F is located in the center in the widthwise direction, the controller 300, as shown in FIG. 8B, causes three unit images UG to be shown in the center of the image area GA in the left-right direction. At this time, the controller 300 causes an auxiliary image SG to be shown on both sides of the three unit images UG in the left-right direction.

Although the position of the three unit images UG is indicated by showing the three unit images UG together with auxiliary images SG in this example, it is to be understood that the position of the three unit images UG may be indicated by only showing the three unit images UG in the image area GA demarcated by straight lines or a box shape without showing the auxiliary images SG.

The controller 300 causes a state of the foil transfer device 1 to be displayed at a lower left portion of the display PN. The state of the foil transfer device 1 is, for example, a ready state in which a temperature of the heating roller 61 is maintained around a predetermined temperature so that foil transfer can be readily executed, a transfer state which indicates that foil transfer is being executed, or a sleep state in which power supply to the heating roller 61 is stopped. In the example shown in FIG. 8, an image of letters "Ready" indicating the ready state is shown.

As shown in FIG. 7B, the foil transfer device 1 further comprises a power button B1, a first shortcut key B2, a second shortcut key B3, a temperature adjustment button B4, a foil save button B5, a menu button B6, a clear button B7, selection buttons B8, B9, an enter button B10, a stop button B11, and a start button B12.

The power button B1 is a button for turning power to the foil transfer device 1 on or off. The first shortcut key B2 and the second shortcut key B3 are buttons for calling up a foil transfer setting registered by a user.

Herein, the foil transfer setting is information about conditions for executing foil transfer. The controller 300 includes a memory unit (not shown) that can store a first foil transfer setting established as a default setting, and a second foil transfer setting and a third foil transfer setting both specified by a user and different from the first foil transfer setting. For example, the first foil transfer setting specifies the entire surface of a sheet S as a foil transfer area on which foil is to be transferred, and a predetermined temperature as the temperature of the heating roller 61. Further, for example, the second foil transfer setting specifies a predetermined area extending from a leading edge of a sheet S as the foil transfer area, and a temperature different from the predetermined temperature as the temperature of the heating roller 61.

The temperature adjustment button B4 is a button for adjusting the temperature of the heating roller 61. For example, when the temperature adjustment button B4 has been pushed, the controller 300 causes the currently set temperature to be shown on the display PN. Thus, a user can change the temperature by operating the selection buttons B8, B9 and the enter button B10 while viewing the display PN.

The foil save button B5 is a button for using the foil in an economized way. Specifically, when the foil save button B5 has been pushed, the controller 300 causes a screen to be shown on the display PN for choosing a foil save mode in which foil transfer is executed only on a part of a sheet S. Herein, the foil save mode includes, for example, a forward area transfer mode in which foil is transferred onto only a forward part of a sheet S, a central area transfer mode in which foil is transferred onto only a central part of a sheet S, and a rearward area transfer mode in which foil is transferred onto only a rearward part of a sheet S. A user can choose a foil save mode by operating the selection buttons B8, B9 and the enter button B10 while viewing the display PN. Choosing of the foil save mode will be described in detail below.

The menu button B6 is a button for causing a menu to be shown on the display PN. The clear button B7 is a button for returning the screen shown on the display to a previous screen, or clearing numerical values or the like relating to a foil transfer setting which will be described below.

The selection buttons B8, B9 are buttons for making a choice among a plurality of options shown on the display PN and/or changing numerical values. The enter button B10 is a button for determining the choice and/or numerical value selected or changed by the selection buttons B8, B9.

The stop button B11 is a button for stopping foil transfer. The start button B12 is a button for executing foil transfer.

Buttons B2 to B10 correspond to a first operation unit configured to output a signal in response to operation of a user. The controller 300 is configured to change the information shown on the display based on signals from the buttons B2 to B10 in a standby state in which foil transfer is not executed, specifically, in the ready state or the sleep state. To be more specific, the controller 300 continuously causes the foil film information to be shown on the display PN in the standby state, but changes at least one item of the foil film information being shown on the display PN to another item upon receiving a signal(s) from the buttons B2 to B10.

The temperature adjustment button B4, the foil save button B5, the selection buttons B8, B9, and the enter button B10 correspond to a third operation unit configured to output a signal in response to operation of a user. The controller 300 has a function of changing a foil transfer setting to a second foil transfer setting or another setting, different from the first foil transfer setting, based on a signal(s) from the buttons B4, B5, B8 to B10. Further, the controller 300 has a function of storing the second foil transfer setting or another setting in such a manner that the setting is linked to the first shortcut key B2 or the second shortcut key B3. The controller 300 also has a function of establishing the second foil transfer setting or another setting as the foil transfer setting based on operation of the first shortcut key B2 or the second shortcut key B3.

Next, the operation of the controller 300 will be described in detail. The controller 300 repeatedly executes the process shown in FIG. 9. The process shown in FIG. 9 starts when power to the foil transfer device 1 is turned on or when the cover 22 is closed.

Figure 9:
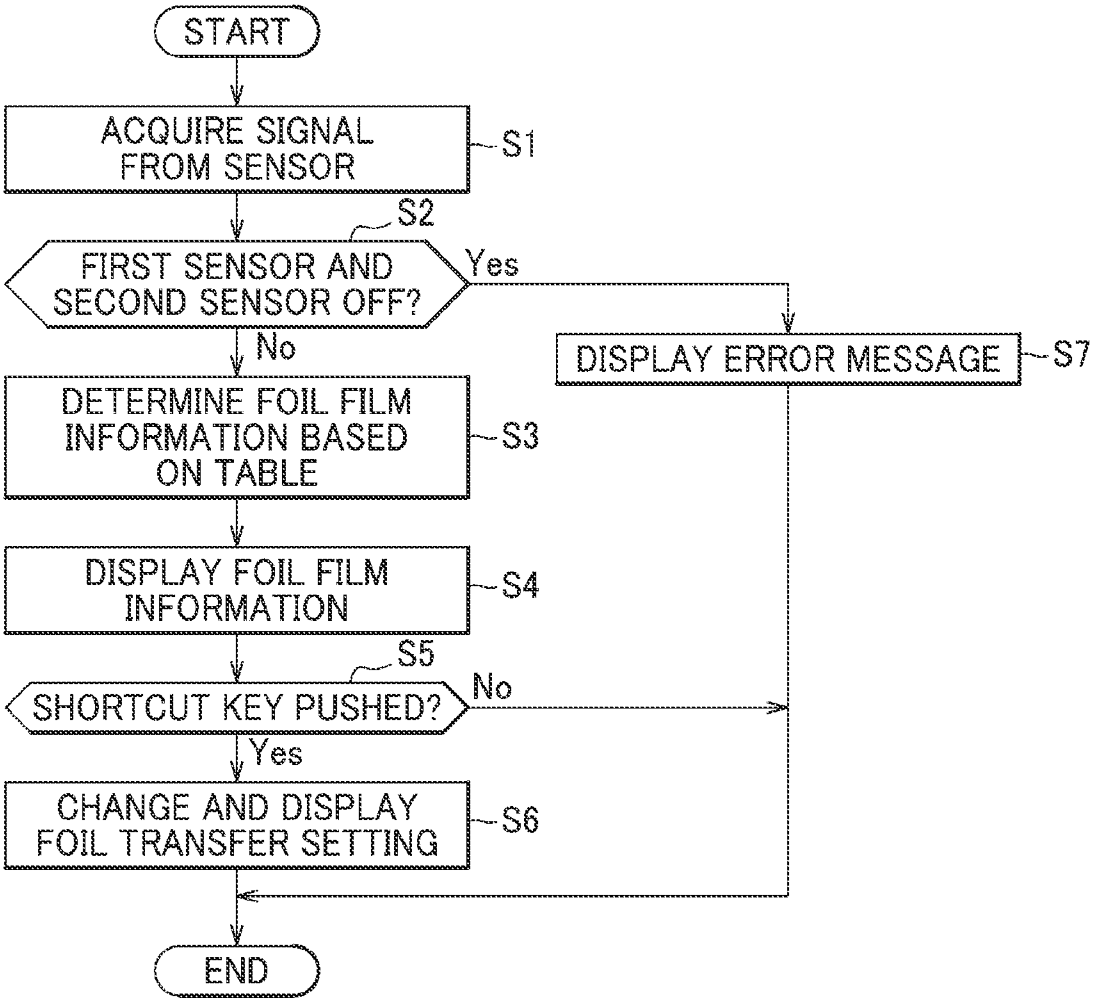
FIG. 9 is a flowchart showing a process executed by a controller.

In the process shown in FIG. 9, the controller 300 first acquires signals from each of the sensors 212, 222, 232 (S1). After step S1, the controller 300 determines whether or not the first sensor 212 and the second sensor 222 are both off (S2).

If it is determined in step S2 that at least one of the first sensor 212 and the second sensor 222 is on (No), the controller 300 determines the foil film information based on a signal(s) from the sensors 212, 222, 232 and a table shown in FIG. 6 (S3). Specifically, for example, if the first sensor 212 is on, the second sensor 222 is off, and the third sensor 232 is on, the controller 300 determines that the width of the foil film F is the first width H1, the foil film F is located at one side in the widthwise direction, and the color of the foil is silver.

After step S3, the controller 300 shows the determined foil film information on the display PN (S4). Specifically, if it is determined that the width of the foil film F is the first width H1, the foil film F is located at one side in the widthwise direction, and the color of the foil is silver, the controller 300 causes the image shown in FIG. 8A to be shown on the display PN.

After step S4, the controller 300 determines whether or not the first shortcut key B2 or the second shortcut key B3 has been pushed (S5). If it is determined in step S5 that the first shortcut key B2 or the second shortcut key B3 has been pushed (Yes), the controller 300 changes the foil transfer setting from the first foil transfer setting established as a default setting to the second foil transfer setting or the third foil transfer setting registered and linked to the first shortcut key B2 or the second shortcut key B3, causes the second foil transfer setting or the third transfer setting to be shown on the display PN (S6), and ends the present process. In step S6, when no foil transfer setting is registered or linked to the first shortcut key B2 or the second shortcut key B3, the controller 300 ends the present process without changing the foil transfer setting or the view shown on the display PN.

If it is determined in step S5 that the first shortcut key B2 or the second shortcut key B3 has not been pushed (No), the controller 300 ends the present process without further processing. If it is determined in step S2 that the first sensor 212 and the second sensor 222 are both off (Yes), the controller 300 causes an error message saying that a foil transfer film cartridge FC is not installed to be shown on the display PN (S7), and ends the present process. The timing to end showing the error message is, for example, after the error is resolved, i.e., such as when a foil transfer film cartridge FC is installed and the cover 22 is closed after the error occurs.

Figure 10:
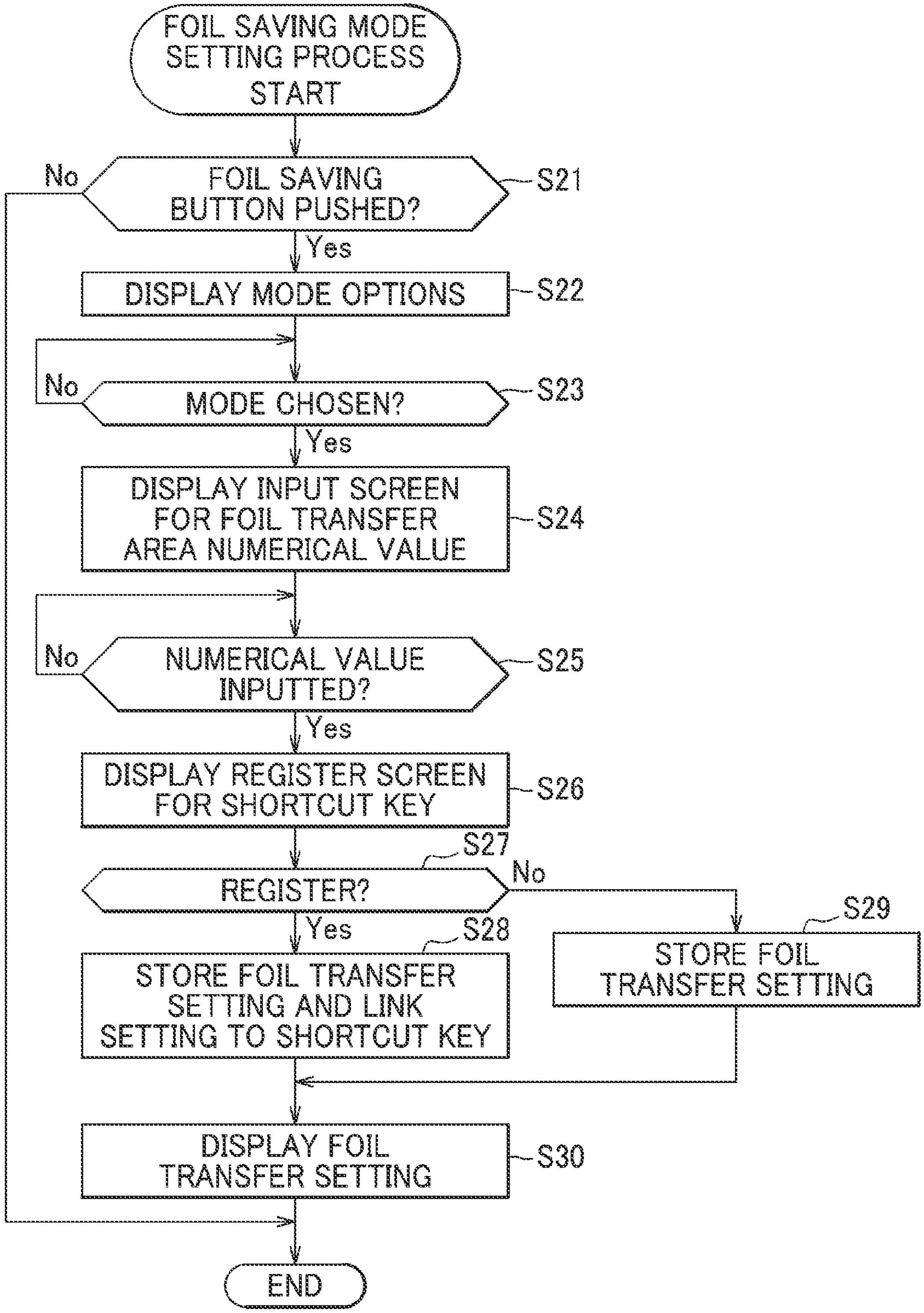
FIG. 10 is a flowchart showing a foil save mode setting process.

Next, a foil save mode setting process for choosing and setting a foil save mode will be explained referring to FIG. 10. The controller 300 repeatedly executes the process shown in FIG. 10. The process shown in FIG. 10 starts when power to the foil transfer device is turned on, or when the cover 22 is closed. In the foil save mode setting process, the controller 300 first determines whether or not the foil save button B5 has been pushed (S21). If it is determined in step S21 that the foil save button B5 has not been pushed (No), the controller 300 ends the present process.

If it is determined in step S21 that the foil save button B5 has been pushed (Yes), the controller 300 causes options for the foil save mode to be shown on the display (S22). Specifically, the controller 300 causes the forward area transfer mode, the central area transfer mode, and the rearward area transfer mode to be shown on the display as the options for the foil save mode. A user chooses one of the options shown on the display PN by operating the selection buttons B8, B9 and the enter button B10.

After step S22, the controller 300 determines whether or not a foil save mode has been chosen (S23). If it is determined in step S23 that a foil save mode has been chosen (Yes), the controller 300 shows a screen, on the display PN, for inputting a numerical value for a foil transfer area (S24). Specifically, for example, if the central area transfer mode is chosen as the foil save mode, the controller 300 shows a screen, on the display PN, for inputting a distance from a leading edge of a sheet S to a forward boundary of the foil transfer area, and a distance from the leading edge of a sheet S to a rearward boundary of the foil transfer area.

If the forward area transfer mode is chosen as the foil save mode, the forward boundary of the foil transfer area will be the leading edge of a sheet S. Thus, the controller 300 shows a screen, on the display PN, for inputting a distance from the leading edge of a sheet S to the rearward boundary of the foil transfer area. If the rearward area transfer mode is chosen as the foil save mode, the rearward boundary of the foil transfer area will be the trailing edge of a sheet S. Thus, the controller 300 shows a screen, on the display PN, for inputting a distance from the leading edge of a sheet S to the forward boundary of the foil transfer area.

It is to be understood that the controller 300 determines the positions of the leading edge and the trailing edge of a sheet S based on a signal from the sheet sensor SS. Further, in step S24, the controller 300 may cause a screen for inputting a setting such as a temperature to be shown on the display PN to allow the user to input the setting such as a temperature of the heating roller 61 in addition to the numerical value(s) for the foil transfer area.

After step S24, the controller 300 determines whether or not a numerical value for the foil transfer area has been inputted (S25). If it is determined that a numerical value has been inputted in step S25 (Yes), the controller 300 causes a screen to be shown on the display PN for choosing whether or not to register the foil transfer setting inputted in step S24 and link the foil transfer setting to the first shortcut key B2 or the second shortcut key B3 (S26).

After step S26, the controller 300 determines whether or not the user has chosen to register the foil transfer setting and link the foil transfer setting to the first shortcut key B2 or the second shortcut key B3 (S27). If it is determined in step S27 that the user has chosen to register the foil transfer setting (Yes), the controller 300 stores the foil transfer setting in such a manner that the foil transfer setting is linked to the first shortcut key B2 or the second shortcut key B3 (S28).

If it is determined in step S27 that the user has not chosen to register the foil transfer setting (No), the controller 300 temporarily stores the foil transfer setting in the memory unit without linking the foil transfer setting to the first shortcut key B2 or the second shortcut key B3 (S29). After step S28 or step S29, the controller 300 causes the foil transfer setting stored in the memory unit, i.e., set by the user, to be shown on the display PN (S30), and then ends the present process. It is to be understood that if the user pushes the start button B12 while the foil transfer setting set by the user, such as the second foil transfer setting, is being shown on the display PN, the controller 300 executes foil transfer according to the second foil transfer setting. The timing to end showing the foil transfer setting on the display PN is, for example, after executing foil transfer, or at a time when a predetermined time period has lapsed after the foil transfer setting has been shown. Further, after displaying of the foil transfer setting on the display PN is ended, the foil film information may, for example, be shown on the display PN.

According to the above-described example, the following advantageous effects can be obtained.

Since it is possible to find out the state of the foil film F from the foil film information shown on the display PN, foil transfer can be easily performed in a desired manner without visually checking the state of the foil film F of the foil transfer film cartridge FC installed in the housing 2.

Since it is possible to display both of the width and the widthwise position of the foil film F by the number and position of unit images UG aligned in the predetermined direction, the space for displaying foil film information can be reduced compared to the case where, for example, the width and the widthwise position of the foil film F are respectively displayed by letters. Thus, the size of the display PN can be reduced.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the following description, members approximately the same as the above-described example are identified by the same reference characters and explanation thereof is omitted.

Figure 11:
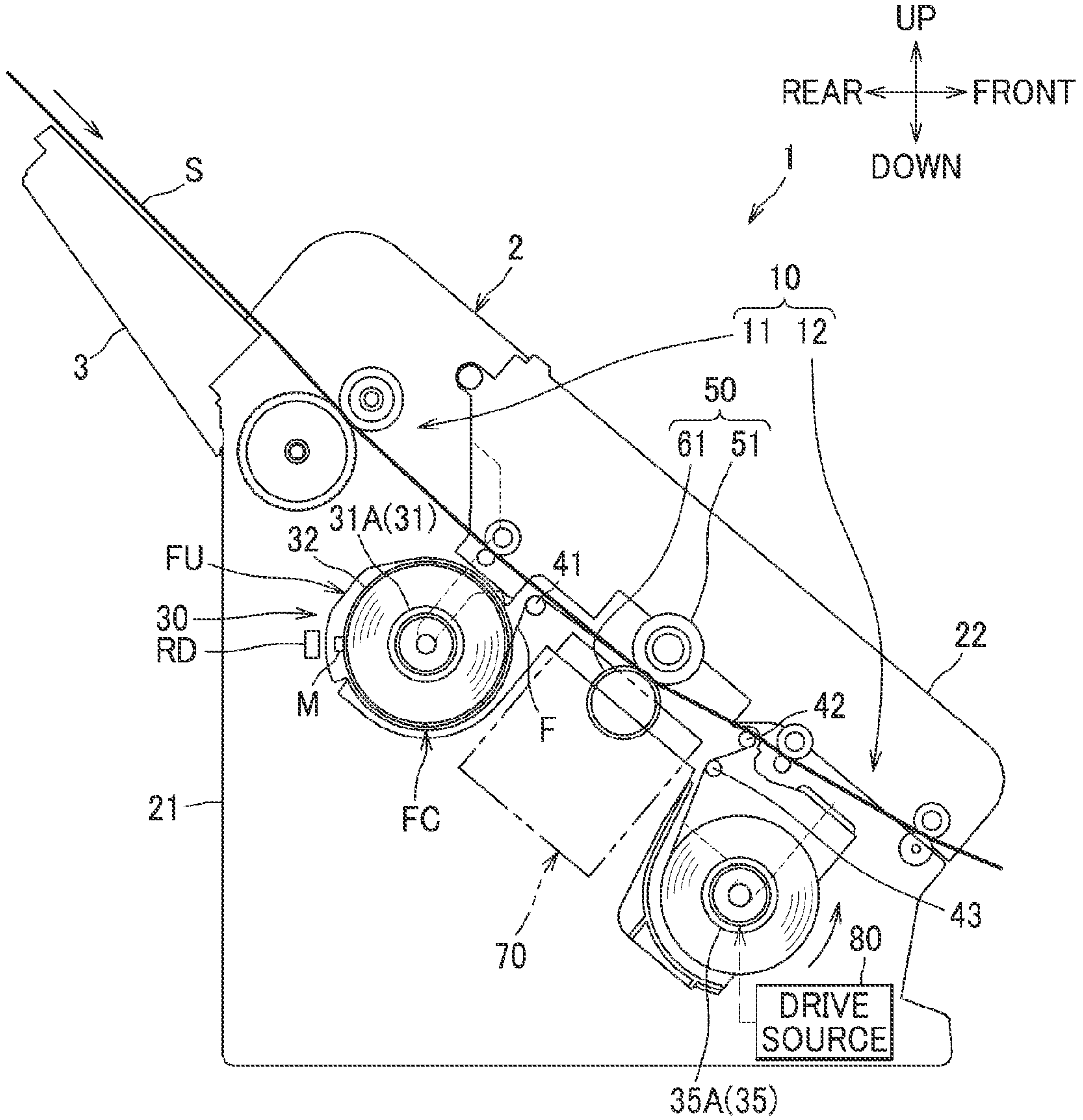
FIG. 11 is an illustration showing a foil transfer device including a modified detector.

In the above-described example, a detector 200 comprising actuators 211, 221, 231 and sensors 212, 222, 232 is given as an example of a detector. However, if the foil transfer film cartridge FC comprises a memory device M that stores foil film information, as shown in FIG. 11, the detector may be a reading device RD that reads the foil film information stored in the memory device M. In this case, different foil film information may be stored in the memory device M according to the type of the foil transfer film cartridge FC.

Further, the detector may be comprised of a push-button switch(s) such as a tactile switch(s).

Although the color of the foil, the width of the foil film F, and widthwise position of the foil film F are detected, and all of these items of information are shown on the display PN in the above-described example, at least one item selected from a group comprising the color of the foil, the width of the foil film, and a widthwise position of the foil film F may be detected and shown on the display. Further, the number of actuators and sensors may be changed as appropriate according to the number of items of foil film information to be detected.

To be more specific, if three types of the third foil transfer film cartridges FC differing only in a color of foil are provided, it is not necessary to detect the width and the widthwise position of the foil film F. Thus, only two actuators and sensors would be necessary. Specifically, if the color of the foil is gold, silver, and red, the foil film information may be determined as follows:

If the first sensor 212 and the second sensor 222 are both off, the controller 300 determines that the third foil transfer film cartridge FC3 is not installed. If the first sensor 212 is on and the second sensor 222 is off, the controller 300 determines that the color of the foil is gold.

If the first sensor 212 is off and the second sensor 222 is on, the controller 300 determines that the color of the foil is silver. If the first sensor 212 and the second sensor 222 are both on, the controller 300 determines that the color of the foil is red. That is, a state in which the third foil transfer film cartridge FC3 is not installed, and the three colors of the foil can be discriminated.

Similarly, only two actuators and sensors would be necessary, for example, if a first foil transfer film cartridge FC1 with gold-colored foil, and two third foil transfer film cartridges FC3 one with gold-colored foil and the other with silver-colored foil are provided, as a lineup of foil transfer film cartridges FC.

In this case, if the first sensor 212 and the second sensor 222 are both off, the controller 300 determines that the foil transfer film cartridge FC is not installed. If the first sensor 212 is on and the second sensor 222 is off, the controller 300 determines that the third foil transfer film cartridge FC3 with gold-colored foil is installed.

If the first sensor 212 is off and the second sensor 222 is on, the controller 300 determines that the first foil transfer film cartridge FC1 with gold-colored foil is installed. If the first sensor 212 and the second sensor 222 are both on, the controller 300 determines that the third foil transfer film cartridge FC3 with silver-colored foil is installed. That is, a state in which the foil transfer film cartridge FC is not installed, the color of the foil, and the width of the foil film can be discriminated.

Although the actuators 211, 221, 231 are configured to be rotatable in the above-described example, the actuators may be linearly movable.

Although the foil film information is continuously shown on the display PN during the standby state in the above-described example, information other than foil film information may be continuously shown on the display PN in the standby state. In this case, the controller 300 may cause the foil film information to be shown on the display PN based on a signal from a second operation unit that outputs a signal according to operation of a user. Specifically, for example, the controller 300 causes the foil transfer setting to be continuously shown on the display PN during the standby state, and in response to the menu button B6 as an example of the second operation unit being held down, the controller 300 causes the foil film information to be shown on the display PN instead of the foil film setting. The timing to end showing the foil film information on the display PN is, for example, after executing foil transfer, or at a time when a predetermined time period has lapsed after the foil film information has been shown.

Although a supply reel 31 and a take-up reel 35 are provided at the foil transfer film cartridge FC in the above-described example, it is possible, for example, to provide the supply reel at the foil transfer film cartridge and the take-up reel at the housing.

Although a foil transfer device for transferring foil onto a toner image formed on a sheet is given as an example of a foil transfer device in the above-described example, the foil transfer device may be any device as long as it transfers foil onto a sheet. For example, the foil transfer device may comprise a thermal head as a heating member for heating a sheet and a foil film. Further, the foil transfer device may be configured to transfer foil onto an ink image formed on a sheet.

Although the foil transfer film cartridge FC is capable of being installed into and removed from the housing main body 21 via the holder 100 in the above-described example, the foil transfer film cartridge may be capable of being directly installed into and removed from the housing main body.

Although the foil film is comprised of four layers in the above-described example, the foil film F may comprise any number of layers as long as it includes the transfer layer and the supporting layer.

The elements described in the above example embodiment and its modified examples may be implemented selectively and in combination.

What is claimed is:

1. A foil transfer device for transferring foil onto a sheet laid on a foil film containing the foil, comprising:

a foil transfer film cartridge including a supply reel on which the foil film is wound;

a housing configured to allow the foil transfer film cartridge to be removably installed therein;

a display provided on an outer surface of the housing to display information;

a detector configured to detect foil film information in a state where the foil transfer film cartridge is installed in the housing, the foil film information including at least one item selected from a group consisting of a color of the foil, a width of the foil film, and a widthwise position of the foil film in a direction of the width of the foil film; and a controller configured to cause the foil film information detected by the detector to be shown on the display.

2. The foil transfer device according to claim 1, wherein the controller is configured to cause the width of the foil film to be shown on the display as an item of the foil film information.

3. The foil transfer device according to claim 2, wherein the controller is configured to cause the widthwise position of the foil film to be shown on the display as an item of the foil film information.

4. The foil transfer device according to claim 3, wherein the display is capable of showing a plurality of unit images aligned in a predetermined direction, and the controller is configured to change the number and position of the unit images shown on the display based on the width and the widthwise position of the foil film.

5. The foil transfer device according to claim 1, wherein the detector comprises:

a first actuator configured to be movable;

a first sensor configured to detect a position of the first actuator;

a second actuator configured to be movable;

a second sensor configured to detect a position of the second actuator, and the foil transfer film cartridge is configured to push at least one of the first actuator and the second actuator selectively according to the foil film information when the foil transfer film cartridge is being installed in the housing.

6. The foil transfer device according to claim 1, wherein the foil transfer film cartridge comprises a memory that stores the foil film information, and the detector is configured to read the foil film information stored in the memory.

7. The foil transfer device according to claim 1, wherein the controller is configured to change the information shown on the display based on an input operation of a user in a standby state in which foil transfer is not executed.

8. The foil transfer device according to claim 1, wherein the controller is configured to cause the foil film information to be shown on the display based on an input operation of a user.

9. The foil transfer device according to claim 1, further comprising a shortcut key, wherein the controller is configured to:

change a foil transfer setting from a first foil transfer setting established as a default setting to a second foil transfer setting different from the first foil transfer setting, based on an input operation of a user;

store the second foil transfer setting in such a manner that the second foil transfer setting is linked to the shortcut key; and establish the second foil transfer setting as the foil transfer setting in response to the shortcut key being operated.

10. The foil transfer device according to claim 1, wherein the housing comprises:

a housing main body having an opening; and a cover that openably covers the opening, and the display is provided on an outer surface of the cover.

* * * * *